United States Patent
Griswold et al.

[11] Patent Number: 6,058,955
[45] Date of Patent: May 9, 2000

[54] DIFFERENTIAL PRESSURE VALVE FOR CONTROLLING A SYSTEM HAVING A HEAT CARRYING MEDIUM

[75] Inventors: David Edward Griswold, Irvine, Calif.; Bjarne Ibsen; Peter Moesby, both of Slagelse, Denmark; Steven Kurt Edwards, Lake Forest, Calif.

[73] Assignee: FlowCon International A/S, Slagelse, Denmark

[21] Appl. No.: 08/656,363

[22] PCT Filed: Dec. 13, 1994

[86] PCT No.: PCT/DK94/00465

§ 371 Date: Jun. 7, 1996

§ 102(e) Date: Jun. 7, 1996

[87] PCT Pub. No.: WO95/17622

PCT Pub. Date: Jun. 29, 1995

[30] Foreign Application Priority Data

Dec. 23, 1993 [DK] Denmark ................... 1458/93

[51] Int. Cl.[7] .................................................. F16K 31/365
[52] U.S. Cl. ........................ 137/1; 251/30.01; 251/129.04
[58] Field of Search ........................ 251/30.01, 129.04, 251/212, 30.02; 137/1

[56] References Cited

U.S. PATENT DOCUMENTS

| | | |
|---|---|---|
| Re. 32,880 | 2/1989 | Lapeyre . |
| 2,501,583 | 3/1950 | Schafer ................... 251/129.04 X |
| 3,112,094 | 11/1963 | Nees et al. . |
| 4,081,171 | 3/1978 | Morgan et al. ................... 251/30.01 |
| 4,180,236 | 12/1979 | Saarem et al. . |
| 4,444,216 | 4/1984 | Loup ................... 251/50 X |
| 4,477,051 | 10/1984 | Ben-Yehuda ................... 251/30.01 |
| 4,488,702 | 12/1984 | Lapeyre . |
| 5,178,324 | 1/1993 | Moesby . |
| 5,213,303 | 5/1993 | Walker . |

FOREIGN PATENT DOCUMENTS

| | | |
|---|---|---|
| 0 412 860 A1 | 2/1991 | European Pat. Off. . |
| 146 203 | 1/1981 | Germany . |
| 288 446 A5 | 3/1991 | Germany . |
| WO 94/21949 | 9/1994 | WIPO . |

*Primary Examiner*—Kevin Lee
*Attorney, Agent, or Firm*—Pennie & Edmonds LLP

[57] ABSTRACT

The invention relates to a differential pressure valve for the control of a plant with a heat carrying medium. The differential pressure valve has a membrane controlled by a differential pressure for the regulation of the flow of the heat carrying medium between an inlet and an outlet, an adjustable closing member between the inlet and the membrane, one or more fixed openings, the areas of which can be changed linearly by the closing member, one or more variable openings, the areas of which are changed by the membrane, and electrically activated members for closing one of the variable openings or fixed openings by force or by time control independently of the flow in the valve. The invention is configured as parts to be inserted in a known differential pressure valve without dismounting it in such a plant. It is the object of the invention in very small steps to control the flow in the whole plant, in a single part thereof or in several sections of a cooling or heating plant, each section being divided into zones.

10 Claims, 12 Drawing Sheets

PRIOR ART

Fig. 1

PRIOR ART

Fig. 3

PRIOR ART

| Type 1 | | Type 2 | SW1 | SW2 | SW3 | SW4 | SW5 | SW6 | DISPLAY |
|---|---|---|---|---|---|---|---|---|---|
| 0.070 | I N D E X   F L O W     L I T E R / S E C | 0.48 | 0 | 0 | 0 | 0 | 0 | 0 | 1.0 |
| 0.086 | | 0.53 | 1 | 0 | 0 | 0 | 0 | 0 | 1.1 |
| 0.102 | | 0.57 | 0 | 1 | 0 | 0 | 0 | 0 | 1.2 |
| 0.118 | | 0.62 | 1 | 1 | 0 | 0 | 0 | 0 | 1.3 |
| 0.134 | | 0.66 | 0 | 0 | 1 | 0 | 0 | 0 | 1.4 |
| 0.150 | | 0.71 | 1 | 0 | 1 | 0 | 0 | 0 | 1.5 |
| 0.166 | | 0.76 | 0 | 1 | 1 | 0 | 0 | 0 | 1.6 |
| 0.182 | | 0.80 | 1 | 1 | 1 | 0 | 0 | 0 | 1.7 |
| 0.198 | | 0.85 | 0 | 0 | 0 | 1 | 0 | 0 | 1.8 |
| 0.214 | | 0.89 | 1 | 0 | 0 | 1 | 0 | 0 | 1.9 |
| 0.230 | | 0.94 | 0 | 1 | 0 | 1 | 0 | 0 | 2.0 |
| 0.246 | | 0.98 | 1 | 1 | 0 | 1 | 0 | 0 | 2.1 |
| 0.262 | | 1.01 | 0 | 0 | 1 | 1 | 0 | 0 | 2.2 |
| 0.278 | | 1.05 | 1 | 0 | 1 | 1 | 0 | 0 | 2.3 |
| 0.294 | | 1.08 | 0 | 1 | 1 | 1 | 0 | 0 | 2.4 |
| 0.310 | | 1.12 | 1 | 1 | 1 | 0 | 0 | 0 | 2.5 |
| 0.326 | | 1.15 | 0 | 0 | 0 | 0 | 1 | 0 | 2.6 |

Fig. 9a

| Type 1 | INDEX FLOW LITER/SEC | Type 2 | SW1 | SW2 | SW3 | SW4 | SW5 | SW6 | DISPLAY |
|---|---|---|---|---|---|---|---|---|---|
| 0.342 | | 1.19 | 1 | 0 | 0 | 0 | 1 | 0 | 2.7 |
| 0.358 | | 1.22 | 0 | 1 | 0 | 0 | 1 | 0 | 2.8 |
| 0.374 | | 1.26 | 1 | 1 | 0 | 0 | 1 | 0 | 2.9 |
| 0.390 | | 1.29 | 0 | 0 | 1 | 0 | 1 | 0 | 3.0 |
| 0.404 | | 1.32 | 1 | 0 | 1 | 0 | 1 | 0 | 3.1 |
| 0.418 | | 1.34 | 0 | 1 | 1 | 0 | 1 | 0 | 3.2 |
| 0.432 | | 1.37 | 1 | 1 | 1 | 0 | 1 | 0 | 3.3 |
| 0.446 | | 1.40 | 0 | 0 | 0 | 1 | 1 | 0 | 3.4 |
| 0.460 | | 1.43 | 1 | 0 | 0 | 1 | 1 | 0 | 3.5 |
| 0.474 | | 1.45 | 0 | 1 | 0 | 1 | 1 | 0 | 3.6 |
| 0.488 | | 1.48 | 1 | 1 | 0 | 1 | 1 | 0 | 3.7 |
| 0.502 | | 1.51 | 0 | 0 | 1 | 1 | 1 | 0 | 3.8 |
| 0.516 | | 1.53 | 1 | 0 | 1 | 1 | 1 | 0 | 3.9 |
| 0.530 | | 1.56 | 0 | 1 | 1 | 1 | 1 | 0 | 4.0 |
| 0.544 | | 1.58 | 1 | 1 | 1 | 1 | 0 | 0 | 4.1 |
| 0.558 | | 1.60 | 0 | 0 | 0 | 0 | 0 | 1 | 4.2 |
| 0.572 | | 1.62 | 1 | 0 | 0 | 0 | 0 | 1 | 4.3 |

Fig. 9b

| Type 1 | INDEX FLOW LITER/SEC | Type 2 | SW1 | SW2 | SW3 | SW4 | SW5 | SW6 | DISPLAY |
|---|---|---|---|---|---|---|---|---|---|
| 0.586 | | 1.64 | 0 | 1 | 0 | 0 | 0 | 1 | 4.4 |
| 0.600 | | 1.66 | 1 | 1 | 0 | 0 | 0 | 1 | 4.5 |
| 0.612 | | 1.67 | 0 | 0 | 1 | 0 | 0 | 1 | 4.6 |
| 0.624 | | 1.69 | 1 | 0 | 1 | 0 | 0 | 1 | 4.7 |
| 0.636 | | 1.71 | 0 | 1 | 1 | 0 | 0 | 1 | 4.8 |
| 0.648 | | 1.73 | 1 | 1 | 1 | 0 | 0 | 1 | 4.9 |
| 0.660 | | 1.75 | 0 | 0 | 0 | 1 | 0 | 1 | 5.0 |
| 0.670 | | 1.76 | 1 | 0 | 0 | 1 | 0 | 1 | 5.1 |
| 0.680 | | 1.78 | 0 | 1 | 0 | 1 | 0 | 1 | 5.2 |
| 0.690 | | 1.79 | 1 | 1 | 0 | 1 | 0 | 1 | 5.3 |
| 0.700 | | 1.80 | 0 | 0 | 1 | 1 | 0 | 1 | 5.4 |
| 0.710 | | 1.82 | 1 | 0 | 1 | 1 | 0 | 1 | 5.5 |
| 0.720 | | 1.83 | 0 | 1 | 1 | 1 | 0 | 1 | 5.6 |
| 0.730 | | 1.84 | 1 | 1 | 1 | 1 | 0 | 1 | 5.7 |
| 0.740 | | 1.85 | 0 | 0 | 0 | 0 | 1 | 1 | 5.8 |
| 0.750 | | 1.87 | 1 | 0 | 0 | 0 | 1 | 1 | 5.9 |
| 0.760 | | 1.88 | 0 | 1 | 0 | 0 | 1 | 1 | 6.0 |

DIFFERENTIAL PRESSURE VALVE FOR CONTROLLING A SYSTEM HAVING A HEAT CARRYING MEDIUM

FIELD OF THE INVENTION

The present invention relates to a differential pressure valve, especially for controlling the liquid flow in a plant for central heating or air-conditioning or a similar plant with a heat carrying, fluid medium, the said differential pressure valve having a membrane controlled by a pressure differential for regulating the flow of the heat carrying medium between an inlet and an outlet, an adjustable closing member between the inlet and the membrane and electrically activated members arranged to be able to close the differential pressure valve by force or by time control independently of the flow in the valve.

BACKGROUND OF THE INVENTION

The plant may for example be a circulation plant where the fluid medium after being heated gives off heat to or after being cooled takes up heat from the surroundings or to/from a secondary fluid medium through at least one heat exchanger or a similar object. Such plants are generally called heating plants or cooling plants (air-conditioning), respectively.

Such a plant is known from U.S. Pat. No. 5,178,324 and is configured in such a manner that it is possible to control the flow in the whole plant, in a single part of the plant or in several sections of a plant being divided into zones.

This plant comprises several heat exchangers, each provided with a valve, the said heat exchangers being arranged to be placed in a number of at least one in each their room in a building where the differential pressure valve is provided in the plant piping.

However, the known plant is encumbered with the drawback that it is controlled solely by the flow in the plant by means of the differential pressure valve. Consequently, the valve cannot operate dynamically and nor can it be adjusted accurately to a predetermined flow in the plant in order to achieve an improved operating economy, if the temperature conditions or the winds inside or outside the building change. Therefore, if such changes occur it will be necessary to intervene to manually bring the closing member into another position.

From U.S. Pat. Nos. 5,213,303, 3,112,094 and 4,180,236 are moreover known differential pressure valves of the type described alone. The known valves are configured to operate statically and therefore they cannot limit the flow to a certain flow in a plant being provided with the valves to ensure a hydraulic balance in the plant. Nor are the valves configured in such a manner that a modification can be carried out while they are mounted. Besides, for reasons of economy it is generally necessary to replace the valves by new valves instead of rebuilding them.

Therefore, it is the object of the present invention to produce a differential pressure valve which can replace the known differential pressure valve as a matter of course, or to indicate such modifications of the known differential pressure valve that these modifications can be mounted on or inserted in the known differential pressure valve without dismounting it to the effect that by means of the modified differential pressure valve the possibility is provided of limiting the flow in the plant automatically to a predetermined, adjustable maximum size in connection with a dynamic reduction of the flow which automatically ensures the hydraulic balance in a versatile plant.

SUMMARY OF THE INVENTION

The object is achieved by a differential pressure valve of the above type which according to the invention is characterized in that the differential pressure valve for preadjustment of the flow has one or more fixed openings, the area of which can be changed linearly by providing the closing member with the electrically activated members.

Due to the dynamic function of the valve the accuracy of the regulation does not depend on fluctuations of the differential pressure and its distribution in the plant. Therefore, the plant can be configured without regard to the concept "valve authority".

A number of advantages are obtained with the differential pressure valve according to the invention:
automatic control of the flow,
possibility of adjustment in very small steps,
linear flow characteristic,
possibility of very precise adjustment of the steps,
automatic adjustment of control/feedback signals,
possibility of display of setting,
possibility of application of electronic equipment.

The possibility is moreover provided of modifying a known plant of the mentioned type in such a manner that it is unnecessary to dismount the known differential pressure valve in that instead it is sufficient to simply dismount a single part of the differential pressure valve or to mount a part on it. Thus, the costs and the drawbacks caused by the readjustment are limited significantly.

In a first embodiment these members comprise a servo-hydraulic mechanism which through a two-way or a three-way solenoid valve with an on/off activation can force the membrane to close.

In a second embodiment the electrically activated members comprise a motor which is arranged to be able to displace the closing member between a closed and an open position.

The independent claims disclose expedient measures in the differential pressure valve according to the invention.

The differential pressure valve according to the invention will be described in closer detail below with reference to the drawings

DESCRIPTION OF THE PREFERRED EMBODIMENT

Figure 1:
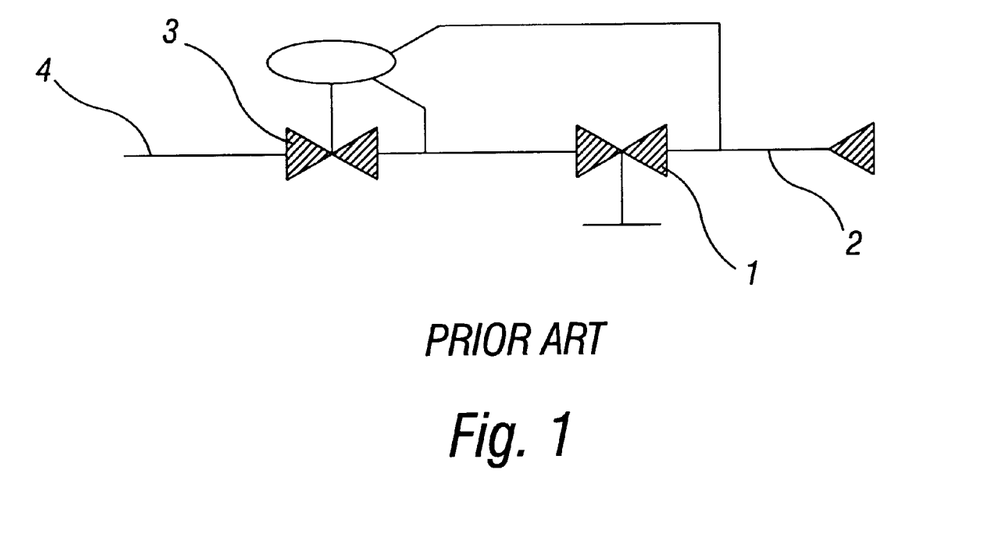
FIG. 1 is a schematic view of a known differential pressure valve configured as a self-acting regulating valve with a hand-operated closing member for the adjustment of the maximum medium circulation in a plant applying a heat carrying medium.

FIG. 1 shows schematically a known differential pressure valve configured as a self-acting regulating valve with a hand-operated closing member for the adjustment of the maximum medium circulation in a plant applying a heat carrying medium.

The medium flows to the differential pressure valve through the piping 2 to a manually adjustable valve 1. The flow continues to a self-acting regulating valve 3, which by means of a membrane maintains a constant pressure differential above the valve 1, and flows on back into the plant piping 4.

The valve 1 is preferably configured so that the valve characteristic (Kv-value) dependence on the displacement is linear. This together with the differential pressure regulation provides a linear dependence on the flow in relation to the displacement of the valve 1 according to the equation:

$$Q=Kv*(Dp)^{1/2},$$

where Q is the flow in the plant and Dp is the pressure differential above the valve 1 which pressure differential is kept at a constant level by the self-acting regulating valve 3.

Figure 2:
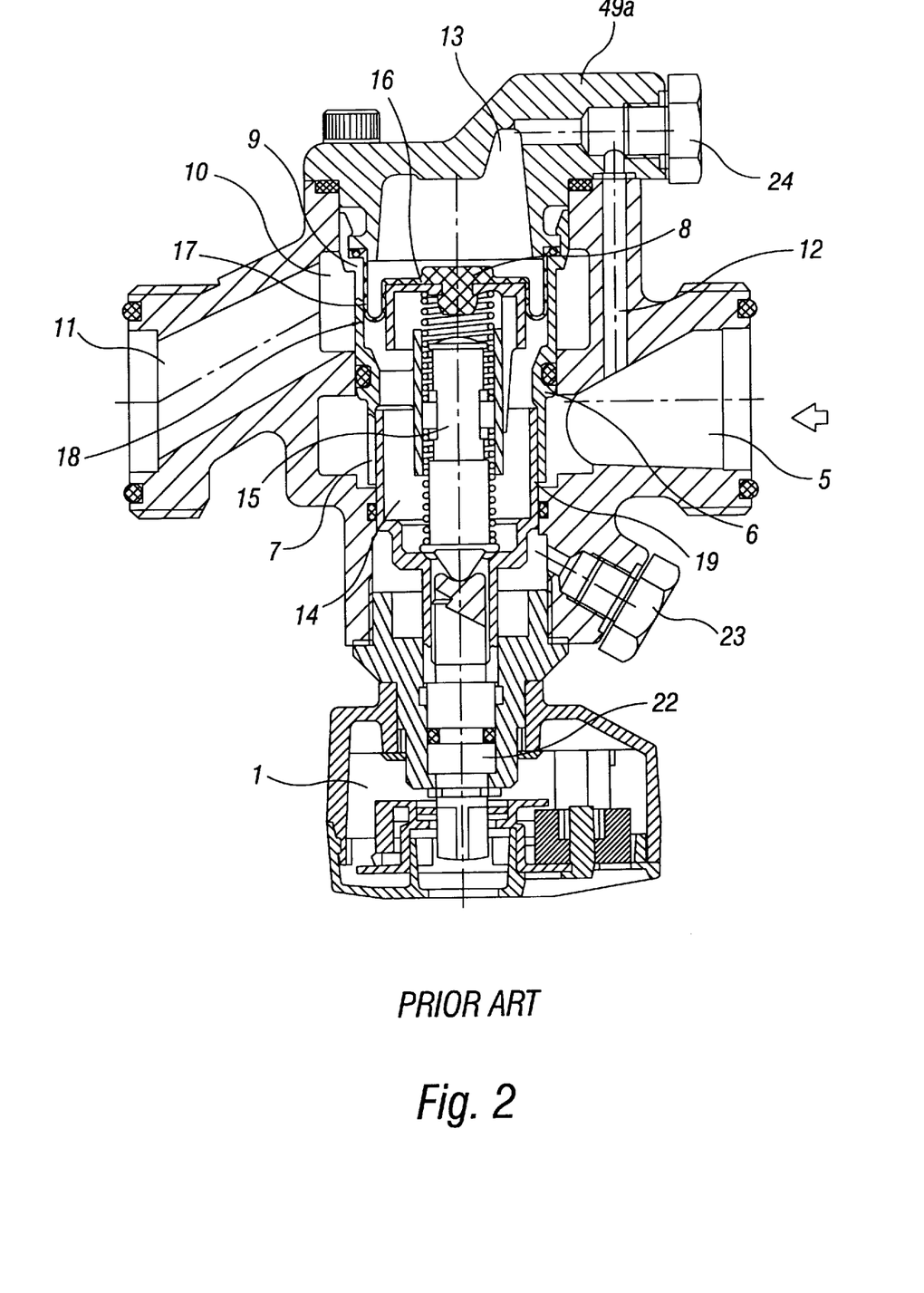
FIG. 2 shows an embodiment of the known differential pressure valve in FIG. 1 to be built into the piping in a plant applying a heat carrying medium.

FIG. 2 shows a known embodiment of a differential pressure valve configured as a self-acting regulating valve 3 with a hand-operated adjustment of the displacement of the valve 1 to be built into the piping in one of the above plants, of. FIG. 1.

The medium flows to the valve through the piping 2 through an inlet 5 and surrounds the lower part of a regulation insertion 6. The flow continues radially through one or more fixed openings 7. From there, the flow of the medium continues axially upwards inside the regulation insertion 6, flows under a membrane 8 and continues radially out of the regulation insertion 6 through one or more variable openings 9. The medium flows to an annular volume 10 and continues out into an outlet 11 and onwards out into the plant piping 4.

From the inlet 5 the pressure, through a bore 12, is carried up onto the top side of the membrane 8 to a displacement volume 13. The bore 12 and the displacement volume 13 are configured in a cover 49a which can be mounted as a part of the differential pressure valve by means of screws or similar securing means.

By the passage of the medium through the fixed openings 7 there will be a pressure differential between the inner cavity 14 of the regulation insertion 6 and the displacement volume 13. The said pressure differential will affect the membrane 8 by an axial force being proportional to the area of the membrane 8 being under pressure and the size of the pressure differential. Opposite this force an internal compressed spring arrangement 15 will react by a force of equal strength and create an equilibrium based on force on the membrane 8. The said state of equilibrium is produced by an axial displacement of a contact face 16 between the membrane 8 and the spring arrangement 15. By the axial displacement the wall 17 of the membrane 8 makes a roll along the inner cylindrical wall 18 of the regulation insertion 6 and the point of the roll thereby cuts off the variable openings 9 to some extent or other. Consequently, the size of the variable openings 9 depends on the axial position of the contact face 16 imparted by the equilibrium of force.

By the passage of the medium through the variable openings 9 there will likewise be a pressure differential between the inner cavity 14 of the regulation insertion 6 and the annular volume 10. The said pressure differential will depend on the size of the variable openings 9 and the flow through the plant.

Together the two pressure differentials created by the passage of the medium through the fixed openings 7 and the variable openings 9, respectively, provide the total pressure differential in the whole plant. The total pressure differential is distributed in such a manner that above the fixed openings 7 there will be an approximated constant pressure differential which is independent of the total pressure differential. The size of the approximated pressure differential only depends on the construction-related relations between forces and changes of force in the spring arrangement 15 and on the compressed area of the membrane 8.

Due to the approximated pressure differential provided above the fixed openings 7 the flow through the plant will remain constant independently of the total pressure differential.

By rotating a spindle 22 manually a cup 19 will be moved axially in relation to the regulation insertion 6 and thereby cut off the fixed openings 7 more or less.

The value of the adjustment of the fixed openings 7 can hereby be changed as a function of the axial movement of the cup 19 (or displacement of the valve 1).

The shape of the fixed openings 7 can easily be configured so that the area of the opening is changed linearly as a function of the displacement. Under these circumstances the predetermined flow will vary linearly in relation to the displacement.

The flow can be verified by a differential pressure measurement between two measuring nipples replacing the shown plugs 23 and 24. The measured pressure differential is converted to flow in the equation:

$$Q=Kv*(Dp)^{1/2},$$

where the Kv-value is stated in relation to the displacement of the valve 1 (an equation-related expression or referring to a graph).

Figure 3:
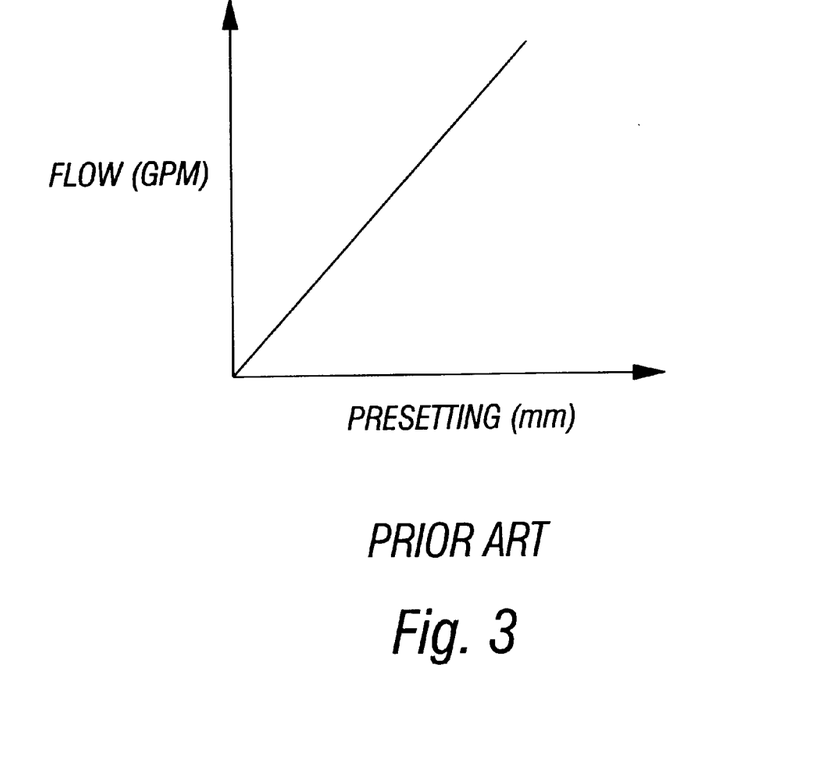
FIG. 3 shows the flow as a function of the displacement of the differential pressure valve in FIGS. 1 and 2.

FIG. 3 shows the flow as a function of the displacement of the valve 1.

Figure 4:
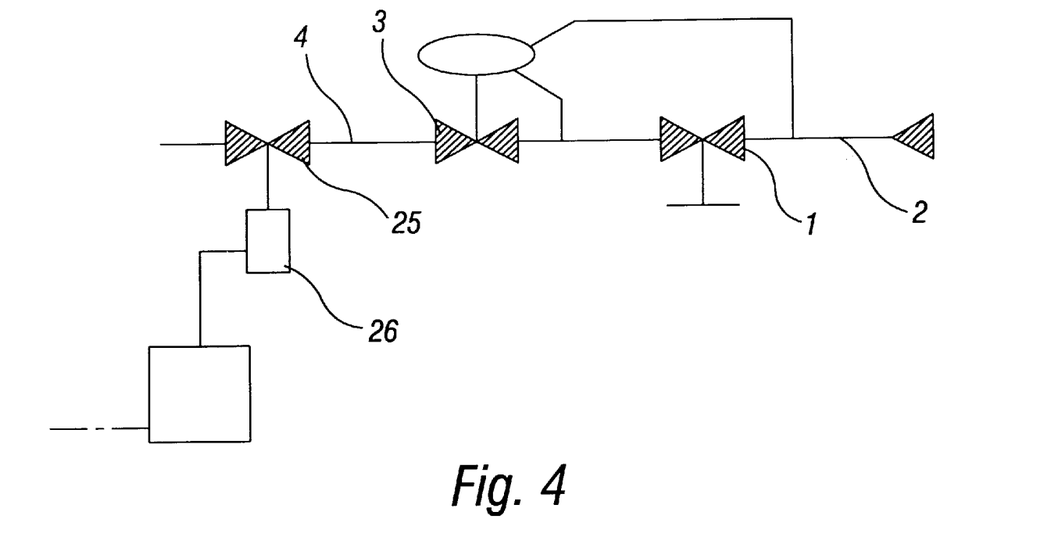
FIG. 4 is a schematic view of a first embodiment of a differential pressure valve according to the invention.

FIG. 4 shows schematically a first embodiment of a differential pressure valve according to the invention configured as a self-acting regulating valve 3 with a hand-operated adjustment of the displacement of the valve 1 and a servo-hydraulic activation 25 through an on/off or an off/on solenoid valve 26 to be used as for example an on/off control of the heat radiation in a heating plant or of the taking up of heat in an air-conditioning plant, respectively.

Figure 5:
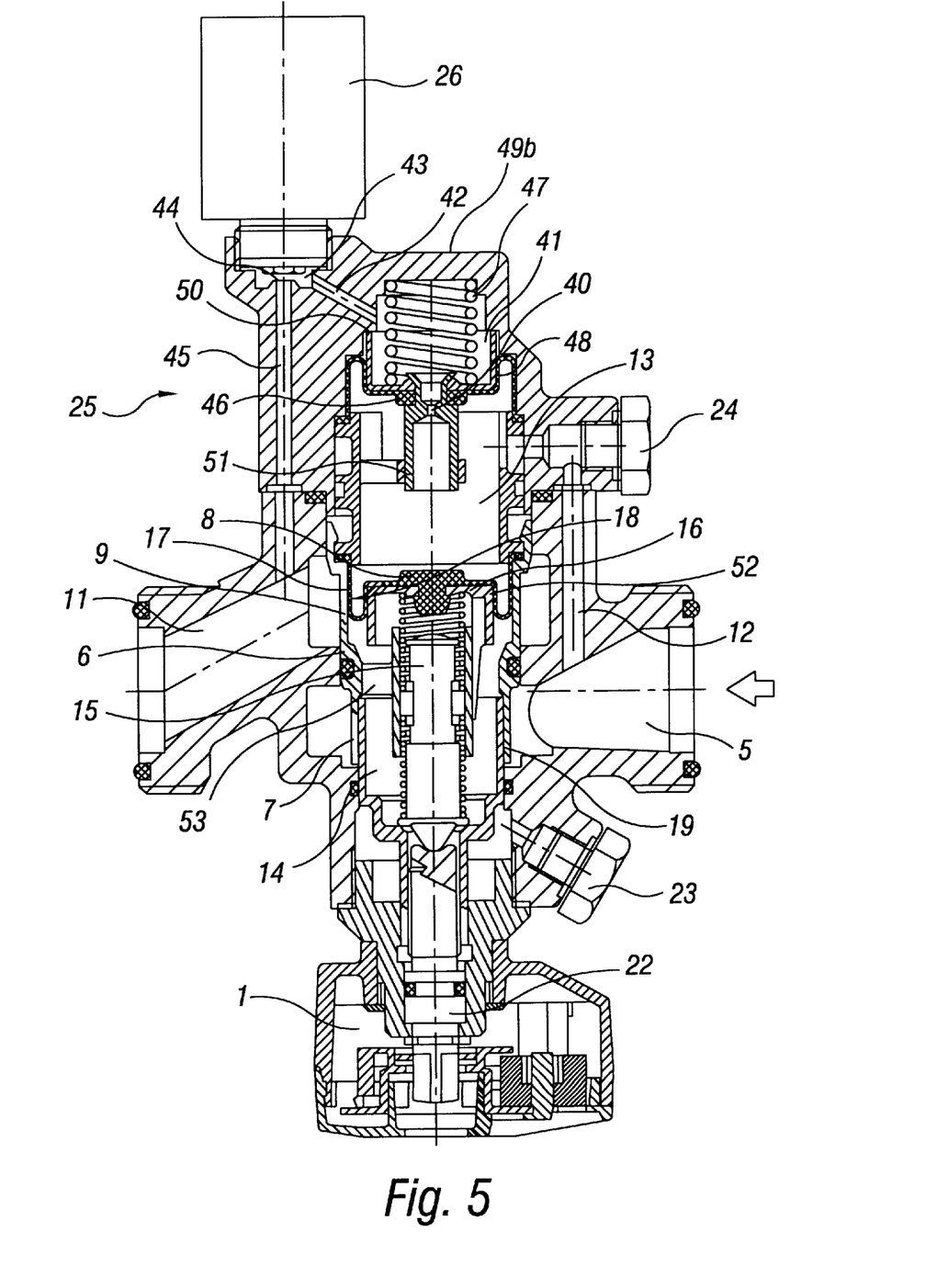
FIG. 5 shows the first embodiment of the differential pressure valve according to the invention in FIG. 4 configured as a self-acting regulating valve with a hand-operated adjustment of the displacement of the valve and a servo-hydraulic activation through an on/off or an off/on solenoid valve.

FIG. 5 shows the first embodiment of a differential pressure valve according to the invention in FIG. 4 corresponding to the modified differential pressure valve in FIG. 2.

From the displacement volume 13 the medium flows through an equalizer 40 to another displacement volume 41 and from here through an internal inclined bore 42 to a chamber 43. Through a seat part 44 belonging to the solenoid valve 26 the medium can flow on through a bore 45 to the outlet 11 and onwards out into the piping 4.

In the shown embodiment of the invention the solenoid valve 26 is a two-way normally open valve (N/O), thus being open to the passage of medium in a dead state. The valve may also be of the type two-way normally closed valve (N/C).

In the open state of the solenoid valve 26 shown in FIG. 5 there will, because of the flow, be a differential pressure between the displacement volumes 13 and 41. The size of the differential pressure will be defined by the relation between the area of passage in the equalizer 40 and the bore 45.

The said differential pressure will affect a membrane 46 by an axial force being proportional to the area of the membrane being under pressure and the size of the differential pressure between the displacement volumes 13 and 41. The force will secure the membrane 46 in a position where a pressure spring 47 is compressed and a membrane guide 48 abuts a recess 50 provided in a cover 49b.

In a state (not shown) where the solenoid valve 26 is activated to close the seat part 44, there will be no flow from the displacement volume 13 through the equalizer 40.

The pressure in the displacement volume 41 will thereby be equalized to the same pressure as in the displacement volume 13 through the equalizer 40 and the pressure spring 47 will exert an axial force resulting in an axial movement of the membrane 46, whereby the nozzle part 51 secured to the membrane 46 is brought to touch the membrane 8. The reserve of force in the pressure spring 47 must be so large that it can overcome the resulting contrary force from the spring arrangement 15. Hereby the axial movement of the membrane 46 and the nozzle part 51, after having touched the membrane 8, will continue the axial movement until a guide 52 for the membrane 8 is mechanically stopped by three radially extending ribs 53 in the regulation insertion 6. The membrane wall 17 will thereby, by a roll down along the inner cylindrical wall 18 in the regulation insertion 6, cut off the variable openings 9 completely, thereby forcing the regulating valve to close.

As an alternative to a two-way solenoid valve 26 a three-way solenoid valve may advantageously be applied if at the same time the hole in the equalizer 40 is omitted to the effect that the pressure in the displacement volume 41 is changed from a high level to a low level by activation/deactivation of the solenoid valve.

The solenoid valve 26, the regulating nozzle 40, the displacement volume 41 and the seat part 44 are coupled to the displacement volume 13 through the inlet 5 and the outlet 11 of the regulating valve.

It will be clear that the servo-hydraulic activation 25 being arranged to forcibly close the membrane 8 comprises the regulating nozzle 40, the displacement volume 41, the bore 42, the chamber 43, the seat part 44, the bore 45, the membrane 46, the pressure spring 47, the membrane guide 48, the recess 50 and the nozzle part 51, these parts being configured in a cover 49b which can replace the cover 49a in the known differential pressure valve as shown in FIG. 2.

Figure 6:
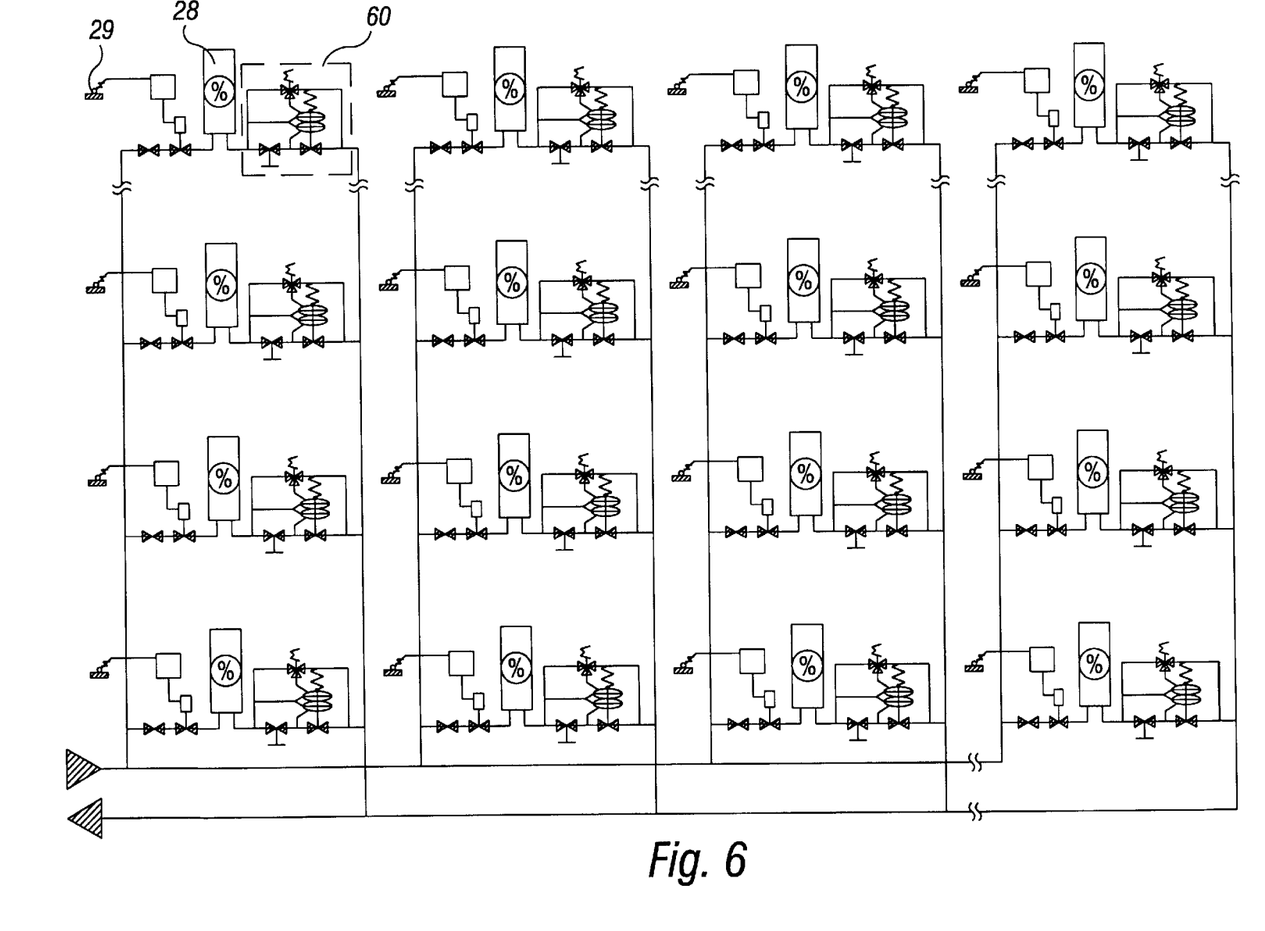
FIG. 6 is a schematic view of the first embodiment of the differential pressure valve according to the invention in FIG. 4 applied in a combination of zone regulation and limitation of the flow to a predetermined value.

FIG. 6 shows schematically the first embodiment of a differential pressure valve according to the invention as shown in FIGS. 4 and 5 and as a servo-controlled, selfacting regulating valve 60 applied for a combined zone regulation and limitation of the flow to a preset value.

This provides the possibility of forcibly closing off specific zones in a complete plant in fixed or variable time intervals. Such a plant may comprise room temperature sensors 29 and cooling surfaces 28 for water/air.

Figure 7:
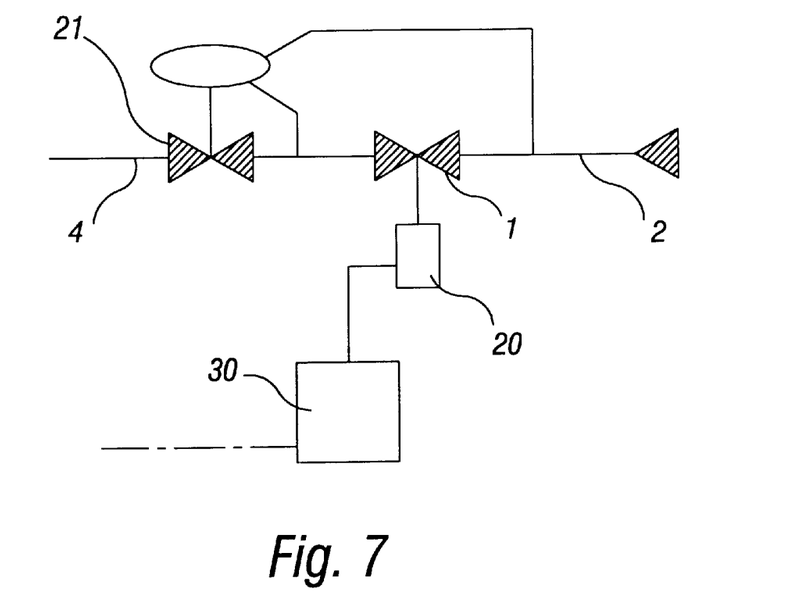
FIG. 7 is a schematic view of a second embodiment of a differential pressure valve according to the invention configured as a self-acting regulating valve with a motor-operated adjustment of the displacement of the valve.

FIG. 7 shows schematically a second embodiment of a differential pressure valve according to the invention as a selfacting regulating valve with an electric activation of the displacement.

The medium flows to the closing member 1 of the differential pressure valve through the piping 2 to a valve 1 controlled by a motor 20. Then the medium flows to the selfacting regulating valve 21, which maintains a constant differential pressure above the valve 1, and onwards back into the piping 4.

Figure 13:
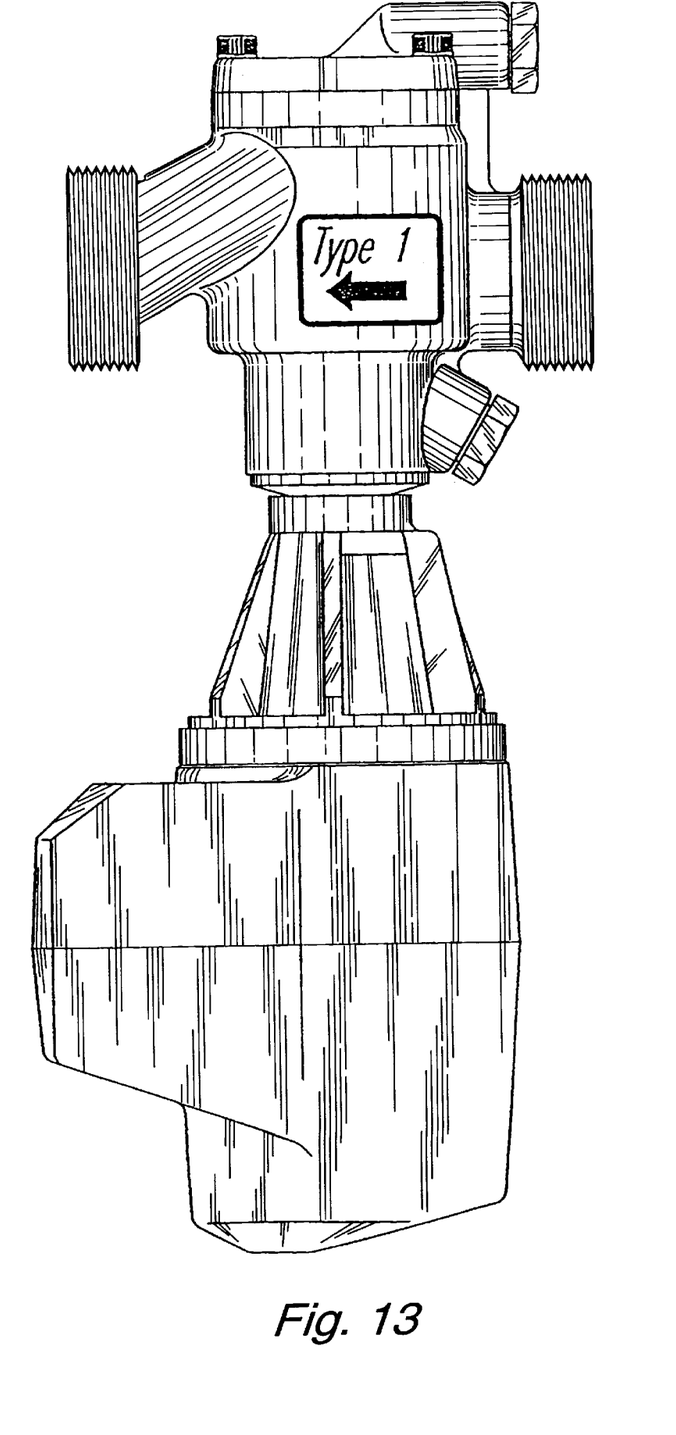
FIG. 13 shows the embodiment in FIG. 2 where a hand-operated control lever is replaced by a motor for controlling the closing member.

Depending on the circumstances, the motor 20 can be a linear motor or, as shown in FIG. 13, a rotatable electric motor provided with a pinion for converting the rotation of the motor to a linear movement.

In the valve 1 controlled by the motor 20 the displacement may for example be preset for a point of balance which can be a mechanical point of balance in the valve/motor or an electric point of balance in the motor 20, so that the displacement of the valve 1 is limited from closed valve to a preset point of operation.

Figure 8:
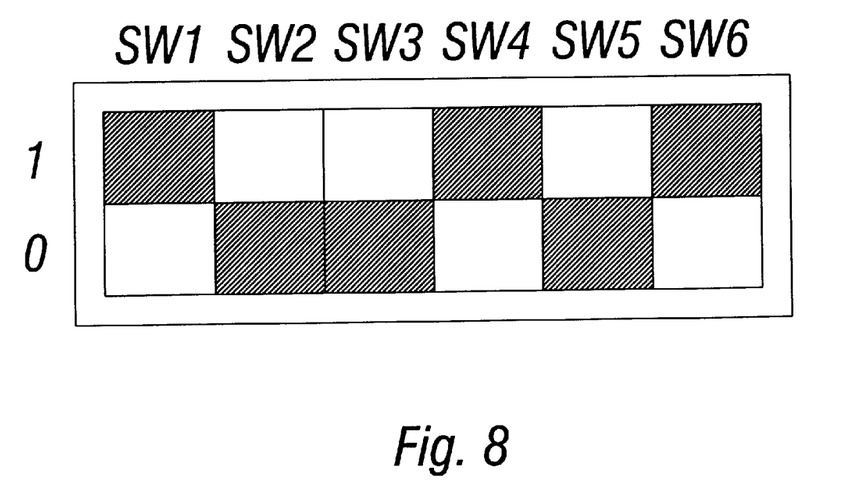
FIG. 8 shows six DIP-switches for use in the coding of a desired point of operation in a motor-controlled valve according to the invention, FIGS. 9a, b, c show a table of the flow in litre/sec for positions of the DIP-switches in FIG. 8.

The desired point of operation may be preset by an electric reduction of the area of operation of the motor. By a rotatable motor the said reduction may range from 1.0 to 6.0 which indicates the maximum number of motor revolutions counted from completely closed valve 1. The reduction is advantageously carried out by means of an integrated circuit to be adjusted for example by means of six so-called DIP-switches (see FIG. 8) being coded with a binary combination to the effect that the desired flow is achieved by means of a given combination code according to the table shown in FIG. 9.

Figure 9A:
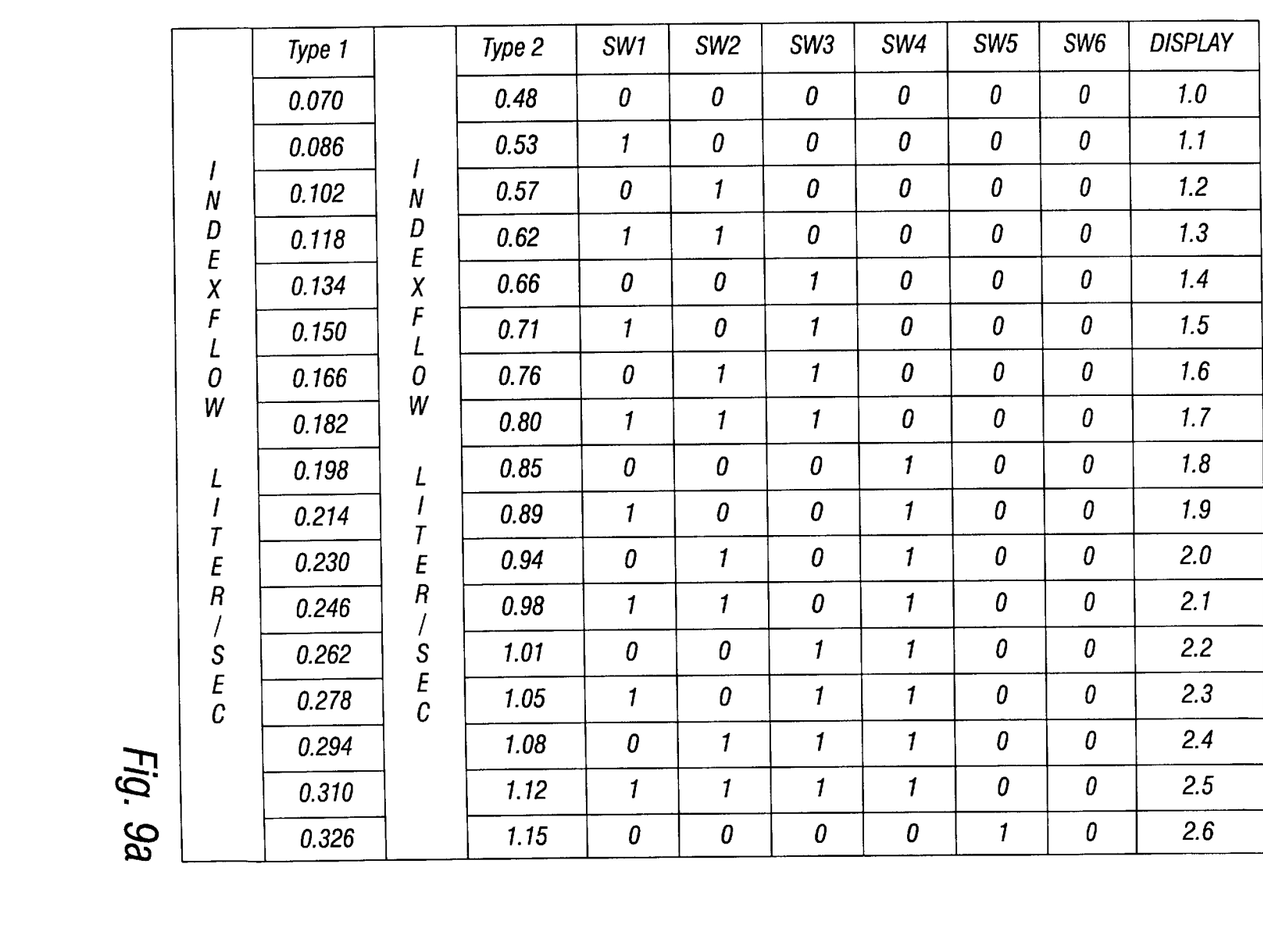
Figure 9B:
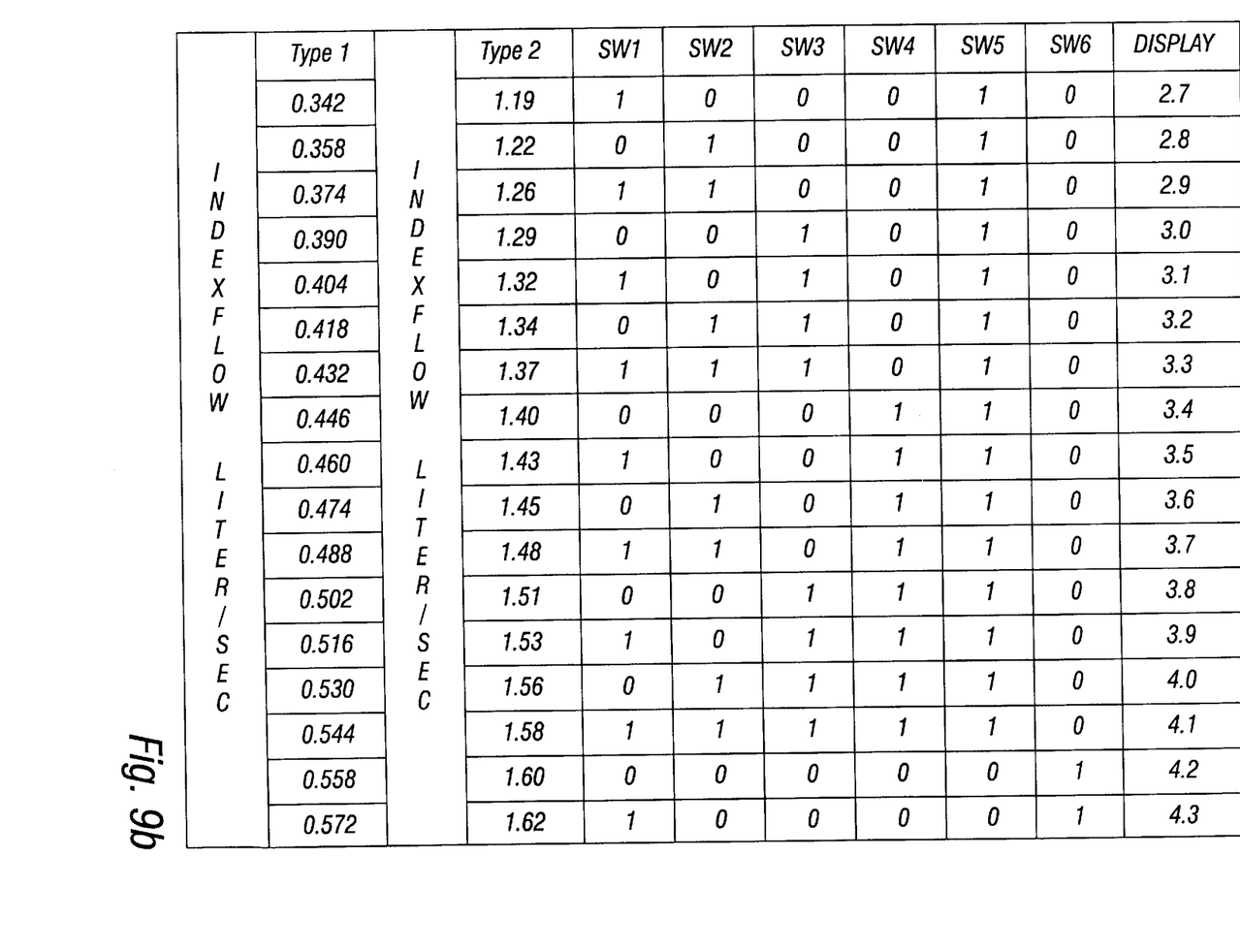
Figure 9C:
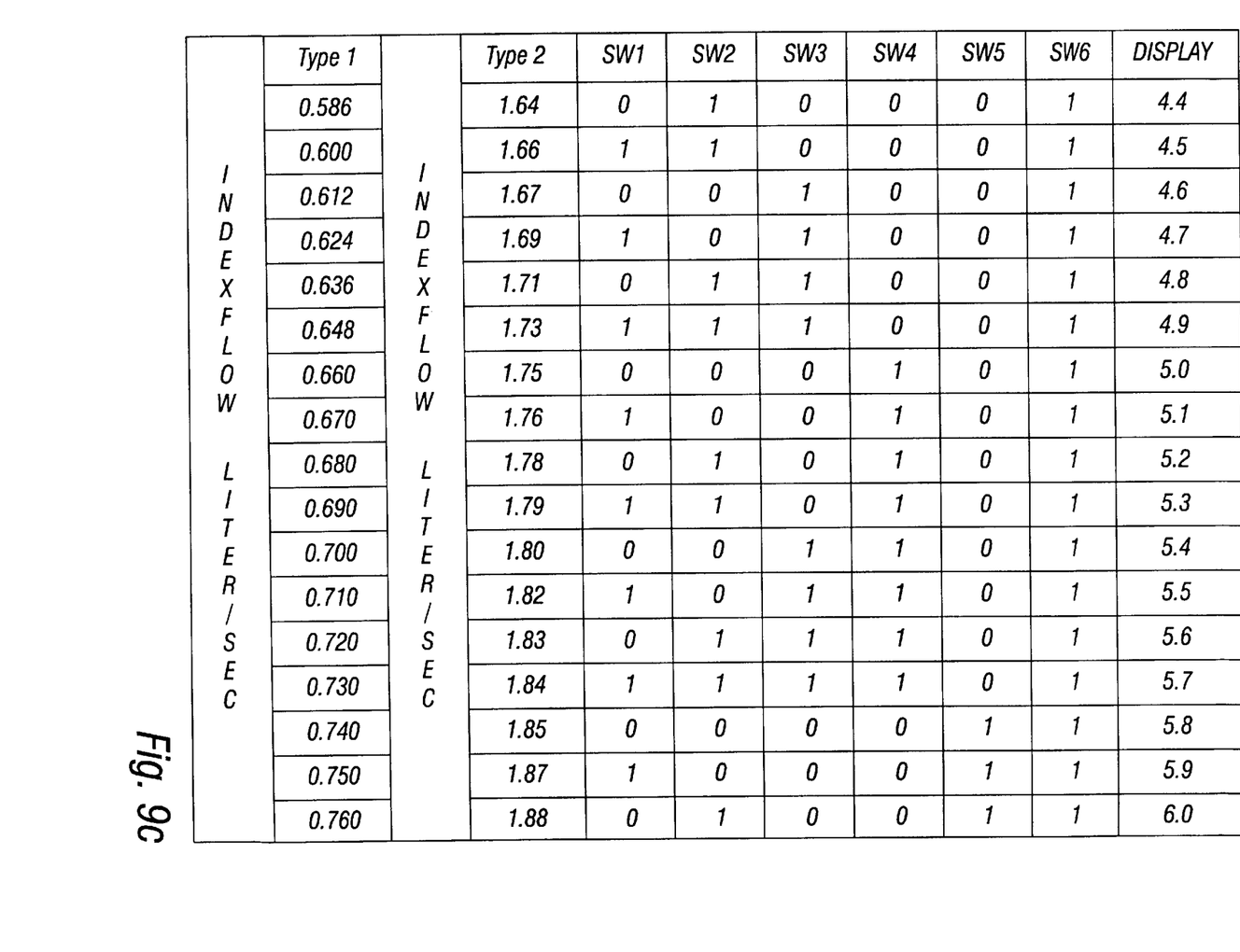

The table shows the position of each of the six DIP-switches in relation to the desired flow. Additionally, the table refers to a position report on a display which can be provided on the motor 20.

The position report can be set back to full scale after a change of the preset point of balance.

This means that the motor 20 when started or when adjusted later on is first activated to close the closing member 1, after which the motor is reversed to the desired point of balance, i.e. opens the closing member 1 to a selected position, thus moving the closing member a certain distance. The said distance is hereafter scaled to correspond to a signal where 0 equals the closed position of the closing member 1 and 10 equals the point of balance.

In an interaction between the said self-acting regulating valve 21 which is dynamically pressure-relieved and has a linear valve characteristic and an electrically activated motor 20 with a position which can be set back to full scale after a change of the maximum displacement (point of balance), the ideal conditions are provided of an electronic regulation of temperature, flow or pressure in one of the plants dealt with.

In this connection it is an advantage that the valve characteristic (Kv-value) of the closing member 1 is linearly dependent on its displacement, cf. the above equation and FIG. 3.

Figure 10:
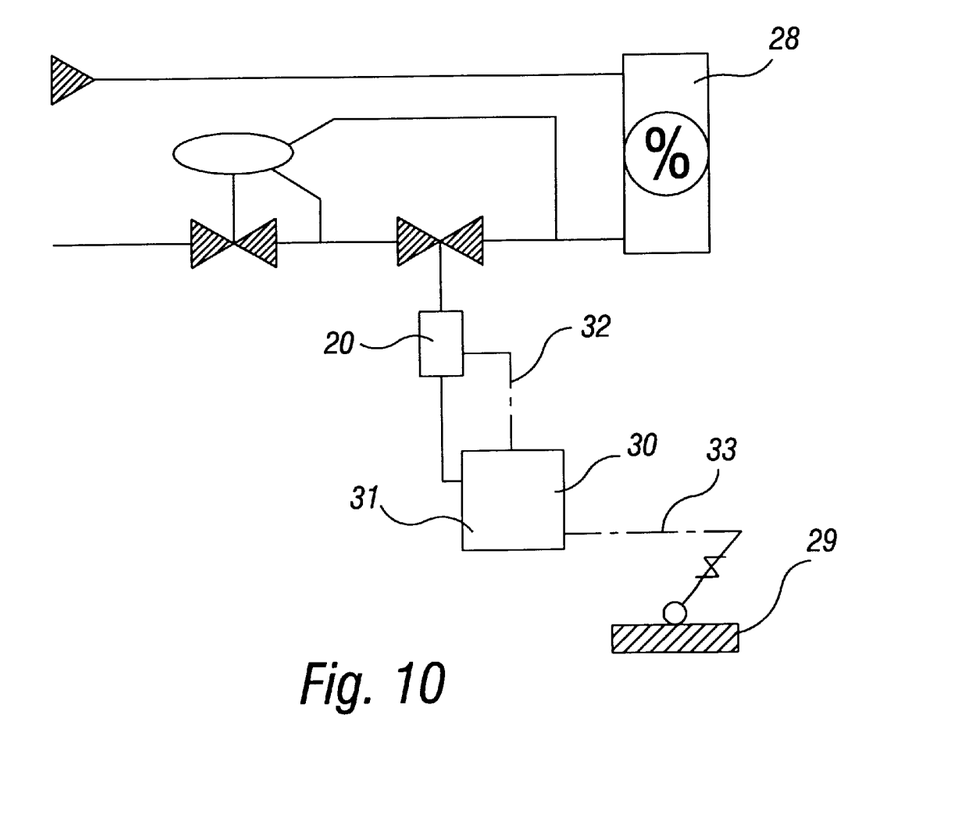
FIG. 10 shows a differential pressure valve according to the invention applied for regulating the room temperature in an air-conditioning plant and for limiting the flow in order to maintain the hydraulic balance in a large versatile plant.

FIG. 10 shows a differential pressure valve according to the invention applied for the regulation of the room temperature in an air-conditioning plant provided with cooling surfaces 28 and for the limitation of the flow in order to maintain the hydraulic balance in a large overall system.

The electric voltage supply to the motor 20 is supplied by a control unit 30 through a supply cable 31. The position of the motor is reported back to the control unit 30 through a signal cable 32. The room temperature is measured by a temperature sensor 29 and is reported back to the control unit 30 through a signal cable 33.

Figure 11:
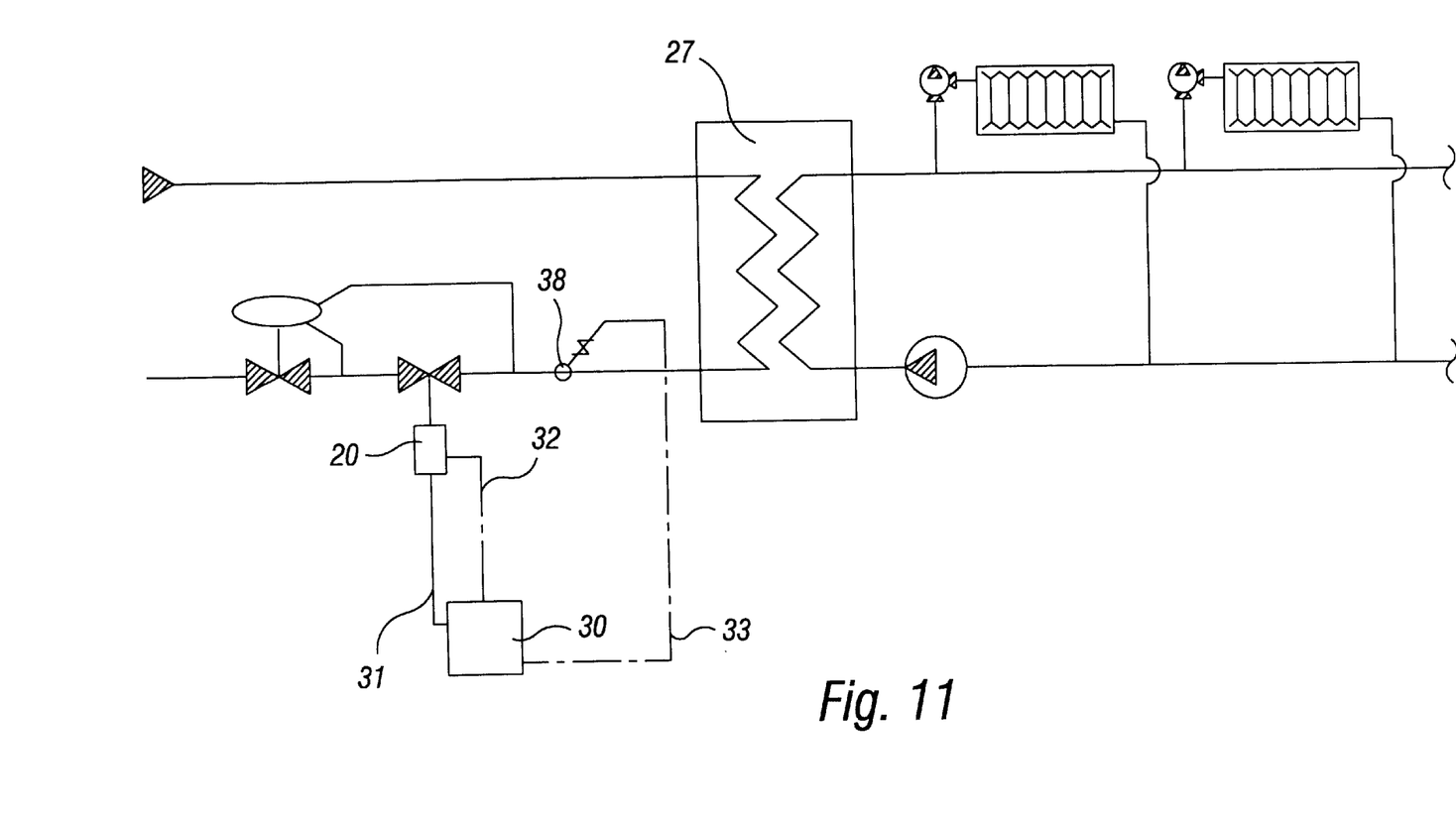
FIG. 11 is a schematic view of a differential pressure valve according to the invention applied in a district heating plant with indirect connection for regulation of the return temperature on the primary side and for limitation of the flow to a predetermined value (point of balance)

FIG. 11 shows an embodiment of a differential pressure valve according to the invention applied in a district heating plant with indirect connection for the regulation of the return temperature on the primary side and for the limitation of the flow to a preset value (equilibrium).

The electric voltage supply to the motor 20 is supplied by a control unit 30 through a supply cable 31. The position of the motor is reported back to the control unit 30 through a signal cable 32. The return temperature of the medium is measured by means of a temperature sensor 38 and is reported back to the control unit 30 through a signal cable 33.

Figure 12:
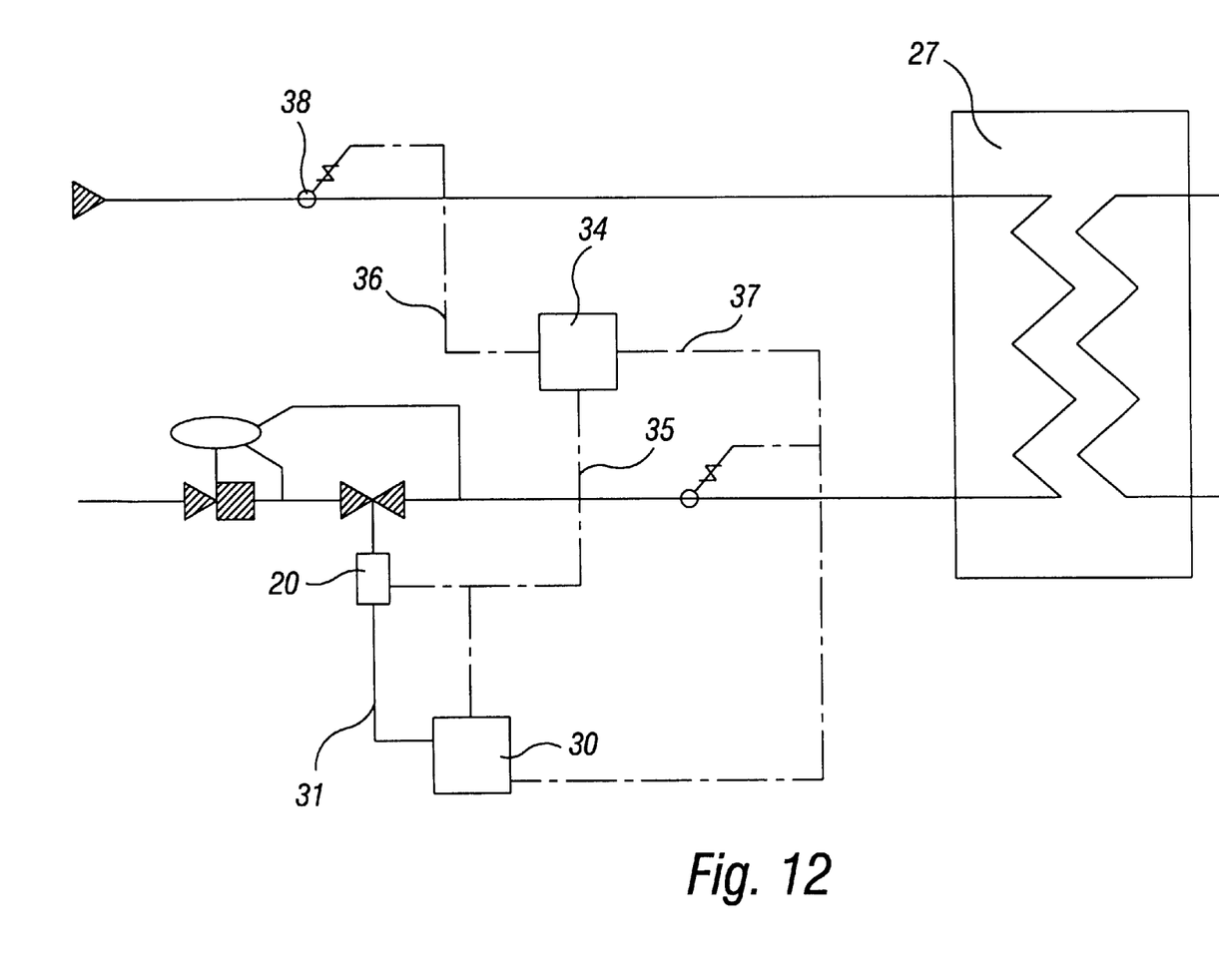
FIG. 12 shows a differential pressure valve according to the invention applied for registering the power and energy consumption in a heating/cooling plant while simultaneously carrying out the primary regulation and the limitation of the flow.

FIG. 12 shows a differential pressure valve according to the invention applied for the registering of the power and energy consumption in a heating/cooling plant while at the same time the primary regulation and the limitation of the flow is carried out.

The position of the motor 20 which is equivalent to the flow in the plant is reported back to a calculation unit 34 through a signal cable 35. The entrance temperature as well as the return temperature of the medium are reported back to the calculation unit 34 through signal cables 36 and 37.

In the calculation unit the signals are dealt with in such a manner that the power consumption is calculated as a function of the flow and the temperature difference between the entrance temperature and the return temperature. Additionally, an integration of the power consumption within a period of time is carried out in order to register the energy consumption of the individual section.

We claim:

1. A differential pressure valve for controlling a liquid flow in a plant for central heating or air conditioning, said differential pressure valve having a membrane (8) controlled by a differential pressure for the regulation of the flow of a heat carrying medium between an inlet (5) and an outlet (11) and an adjustable closing member (1) between the inlet (5) and the membrane (8), characterized in that the differential pressure valve for presetting of the flow has one or more fixed openings (7), the areas of which can be changed linearly by the closing member (1), one or more variable openings (9), the areas of which are changed by the membrane (8), and electrically activated members (25, 26; 20) for closing one of the variable openings (9) or fixed openings (7) by force or time control independently of the flow in the valve.

2. The differential pressure valve of claim 1, wherein the valve has two plugs (23, 24) for verifying the flow by measurement and subsequent calculated conversion by an equation or by a chart.

3. The differential pressure valve of claim 1, wherein the electrically activated members comprise a servo-hydraulic mechanism (25) with an on/off activation through a two-way or a three-way solenoid valve (26).

4. The differential pressure valve of claim 1, wherein the electrically activated members comprise a motor (20) arranged to displace the closing member (1) between a closed and an open position.

5. The differential pressure valve of claim 4, wherein the displacement of the closing member (1) between the open and the closed positions can be preset mechanically in the closing member (1), mechanically in the motor (20), or electrically in the motor (20).

6. The differential pressure valve of claim 5, wherein the position of the displacement of the closing member (1) can be converted to a proportional control signal being at the disposal of an electronic calculation unit or control unit (34).

7. The differential pressure valve of claim 5 or 6, wherein the position of the displacement of the closing member (1) in relation to an arbitrary preset equilibrium can be converted to a proportional control signal to be reset to full scale after a change or a preset equilibrium.

8. In a method for zone regulation of a heating/cooling plant including the steps of circulating a heat carrying fluid medium from a supply piping, through at least one heat exchanger in each of a plurality of rooms in a building, to a return piping; and regulating flow of the heat carrying fluid medium with a differential pressure valve placed in the return piping, said differential pressure valve having a membrane (8) controlled by a differential pressure for the regulation of the flow of the heat carrying medium between an inlet (5) and an outlet (11), an adjustable closing member (1) between the inlet (5) and the membrane (8), one or more fixed openings (7), the areas of which can be changed linearly by the closing member (1) to preset the flow, and one or more variable openings (9), the areas of which are changed by the membrane (8), the improvement comprising:

maintaining a hydraulic balance in the plant by closing one of the variable openings (9) or fixed openings (7) by force or time control independently of the flow in the valve with electrically activated members (25, 26; 20).

9. The method of claim 8 further comprising the steps of measuring a temperature of the heat carrying fluid medium in the supply piping by a first sensor to create a first signal, measuring a temperature of the heat carrying fluid medium in the return piping by a second sensor to create a second signal, and calculating temperature differences in calculation units based on said first and second signals, and using the temperature differences and the flow of the heat carrying fluid medium for surveillance and registration of power and energy consumption.

10. A differential pressure valve for controlling flow of a heat carrying fluid medium in a plant for central heating or air conditioning, said differential pressure valve having:

a membrane controlled by a differential pressure for regulation of the flow between an inlet and an outlet;

one or more fixed openings located between the inlet and the membrane for presetting the flow to a desired rate, said presetting resulting from linearly changing areas of the fixed openings by adjusting a closing member;

one or more variable openings located between the membrane and the outlet, areas of which are changed by the membrane; and electrically activated members for closing one of the variable openings or fixed openings by force or time control independently of the flow in the valve.

\* \* \* \* \*